United States Patent
Raevsky et al.

(10) Patent No.: US 9,135,448 B2
(45) Date of Patent: Sep. 15, 2015

(54) SYSTEM AND METHOD FOR WRITING TO REMOVABLE MEDIA

(71) Applicants: Alexey Raevsky, Moscow (RU); Maxim Nikulin, Moscow (RU); Roman Vasiliev, Moscow (RU)

(72) Inventors: Alexey Raevsky, Moscow (RU); Maxim Nikulin, Moscow (RU); Roman Vasiliev, Moscow (RU)

(73) Assignee: Zecurion Inc., Moscow (RU)

( * ) Notice: Subject to any disclaimer, the term of this patent is extended or adjusted under 35 U.S.C. 154(b) by 0 days.

(21) Appl. No.: 13/662,180

(22) Filed: Oct. 26, 2012

(65) Prior Publication Data

US 2014/0123206 A1  May 1, 2014

(51) Int. Cl.
*G06F 21/60* (2013.01)
*G06F 21/00* (2013.01)
*G06F 12/14* (2006.01)

(52) U.S. Cl.
CPC ............... *G06F 21/60* (2013.01); *G06F 21/00* (2013.01); *G06F 12/14* (2013.01)

(58) Field of Classification Search
CPC ......... G06F 21/24; G06F 21/00; G06F 21/60; H04L 9/28
USPC .......................... 726/1; 711/112, 164; 380/28
See application file for complete search history.

(56) References Cited

U.S. PATENT DOCUMENTS

| 2007/0028067 A1* | 2/2007 | Hinrichs et al. ............... 711/164 |
| 2009/0055889 A1* | 2/2009 | Carlson et al. ..................... 726/1 |
| 2011/0268265 A1* | 11/2011 | Lathrop .......................... 380/28 |

* cited by examiner

*Primary Examiner* — Jeffrey Pwu
*Assistant Examiner* — Samuel Ambaye
(74) *Attorney, Agent, or Firm* — Vladimir Tsirkin

(57) ABSTRACT

The invention provides a system and method for writing data to a removable media device in accordance with a security policy. According to a method of the invention a request to write data to a first file on the removable media device is detected. Dummy data is written to the first file instead of writing the requested data. The requested data is written instead to a corresponding second file on a fixed media device. The corresponding second file is compared to a security policy. Response to the write request is based on the results of the comparison.

6 Claims, 5 Drawing Sheets

SYSTEM AND METHOD FOR WRITING TO REMOVABLE MEDIA

FIELD OF THE INVENTION

The present invention relates to systems and methods for writing data to removable media devices and more particularly to systems and methods for writing data to a removable media device in accordance with a security policy.

BACKGROUND OF THE INVENTION

Removable media devices enable users to extract significant amounts of sensitive data from a data source. Moving data using thumb drives or other removable media devices has become a common a practice, even among information technology and security specialists. Such data transfers go largely undetected. Once sensitive data has moved to a removable storage device it is easily removed from the enterprise and compromised. Thus companies, governments and other organizations risk losing the data or exposing it to unauthorized recipients. Further risks include violations of laws and regulations requiring audit trails or encryption when moving of sensitive data.

Banning the use of removable media or rendering removable media devices inoperable is not a viable solution. Removable devices have many legitimate business applications. Encrypting the data when moving it to removable media is one solution. However, encryption has drawbacks as a security mechanism for removable media. Encrypting large amounts of data can be time consuming and encryption policies are difficult to enforce. Without user diligence and willingness to comply with encryption requirements, encryption is a relatively weak security mechanism for removable media.

What are needed are systems and methods for writing to removable media that would automatically enforce a removable media security policy without relying on a user to take action such as encrypting data to be transferred. Further needed are systems and methods for enforcing a removable media security policy that are transparent to a user

SUMMARY OF THE INVENTION

The invention solves the problem by providing a system and method for writing data to a removable media device in accordance with a security policy. According to a method of the invention a request to write data to a first file on the removable media device is detected. Dummy data is written to the first file instead of writing the requested data. The requested data is written instead to a corresponding second file on a fixed media device. The corresponding second file is compared to a security policy. Response to the write request is based on the results of the comparison.

DESCRIPTION OF THE DRAWING FIGURES

These and other objects, features and advantages of the invention will be apparent from a consideration of the following detailed description of the invention considered in conjunction with the drawing figures, in which.

DETAILED DESCRIPTION OF THE INVENTION

For purposes of this specification, the term 'removable media' refers to data storage media capable of being removed from a computer without powering the computer off. Removable media includes magnetic, optical and solid state storage media. The term 'removable media device' refers to a removable media drive or other physical interface configured to receive removable media and operatively couple the received removable media to a computer for reading and writing to and from the removable media.

Examples of removable media devices include Universal Serial Bus (USB) flash drives and external hard disc drives. A USB flash drive is a data storage device that includes flash memory with an integrated USB interface. Further examples of removable media include, but are not limited to optical discs including Blu-ray discs, digital video discs (DVD) and compact discs (CD), memory cards such as CompactFlash cards and secure digital cards, memory sticks, floppy disks, zip disks and magnetic tapes. In general, computers read and write to removable media devices using the same system commands as for a fixed disk drive. The storage space on the removable media will typically appear to the computer operating system as any other drive would.

Figure 1:
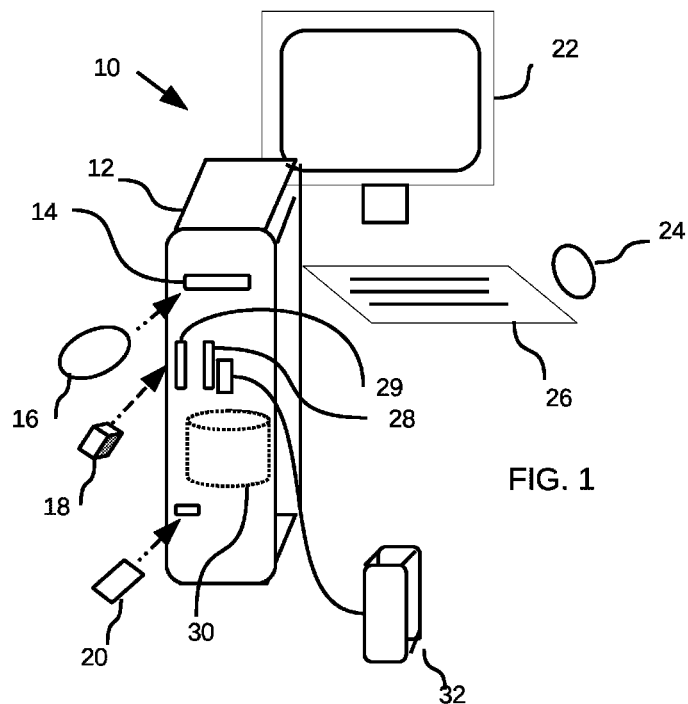
FIG. 1 is a pictorial diagram illustrating a typical computer system including removable storage media.

FIG. 1 illustrates an example computer system 10. Computer system 10 may comprise a conventional computer system such as a desktop or laptop computer. Computer system 10 may also comprise a portable computing platform such as a netbook or tablet device including a removable media device. Computer system 10 is shown to comprise a plurality of removable media devices of various types. The number and type of removable media devices illustrated in FIG. 10 is for illustrative purposes. The invention is not limited in application to computer systems having a particular number of removable media devices. Various embodiments of the invention will comprise greater or fewer removable devices than are illustrated in FIG. 1. The invention is suitable for use with any computer system comprising at least one removable storage device.

As illustrated computer system 10 comprises universal serial bus (USB) removable media devices 28 and 29. USB removable media devices 28 and 29 are configured to receive media such as thumb drive 18 and to store data thereupon. A computer user inserts thumb drive 18 into a corresponding receptacle of USB removable media device 28. The user may then operate one or more input devices such as keyboard 26 and mouse 24 to read and write data to and from USB removable media device 28. Once data is written to thumb drive 18, thumb drive 18 may be removed from its corresponding receptacle of USB drive 28.

Computer system 10 further comprises removable media devices such as a digital video disk (DVD) drive or compact disk (CD) drive 14. DVD drive 14 is configured to receive removable media comprising a DVD or a CD 16 inserted by a computer user.

In addition to removable media devices, computer system 10 further comprises at least one fixed media device 30. Fixed media device 30 comprises a hard drive such as an optical or magnetic storage device.

Figure 2:
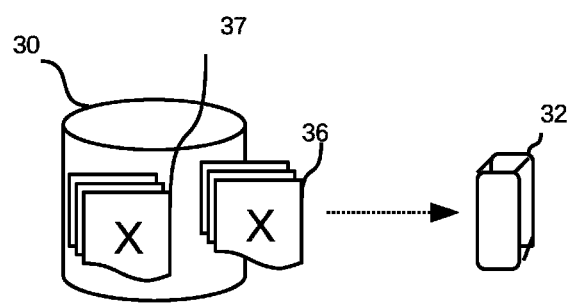
FIG. 2 is a pictorial diagram illustrating an write operation to a removable media device.

FIG. 2 is a pictorial diagram illustrating the concept of copying sensitive data from a fixed drive to a removable media device. In FIG. 2 sensitive data are stored in files 37. Files 37 reside on a fixed media device 30. Copies 36 of sensitive files 37 are written to removable media device 32. Removable media device 32 may then be disconnected from computer 10. Removable media device 32, including sensitive data comprising files 36 may then be carried by a user to a second computer at any location. Removable media device 32 may be connected to the second computer and the files 36 read or copied from the removable media device to the second computer.

Figure 3:
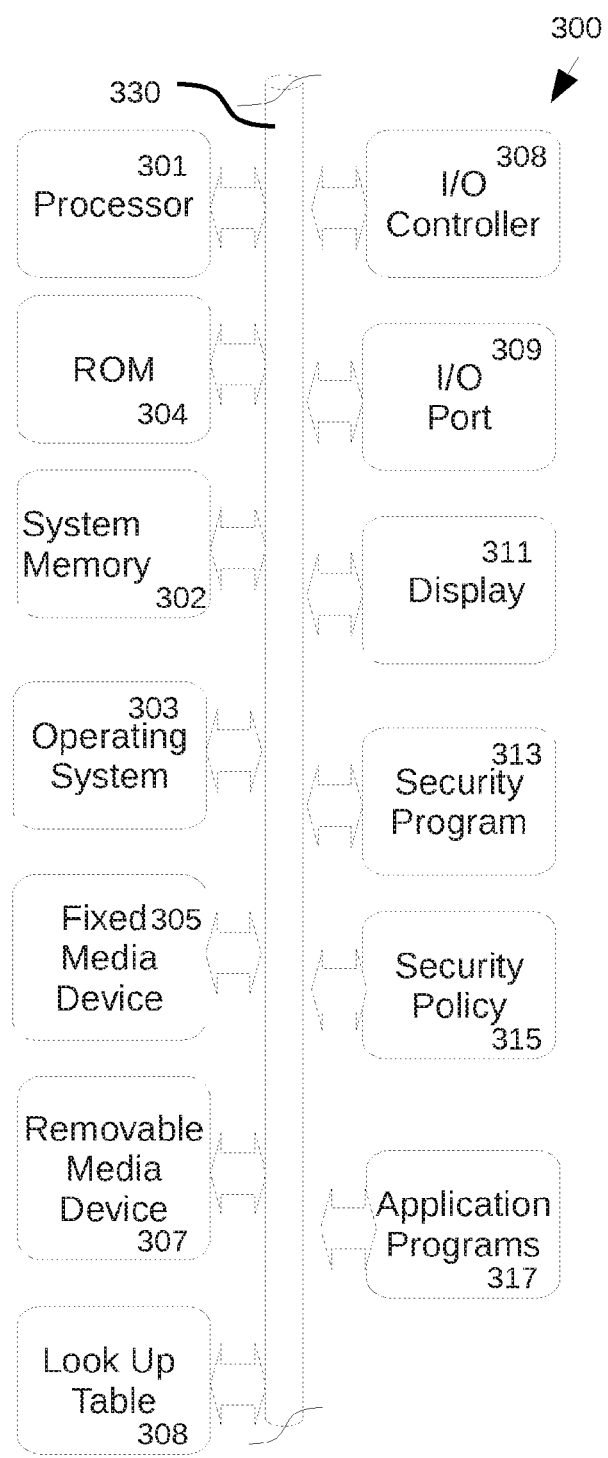
FIG. 3 is a block diagram illustrating a system for writing to removable data according to an embodiment of the invention.
Figure 4:
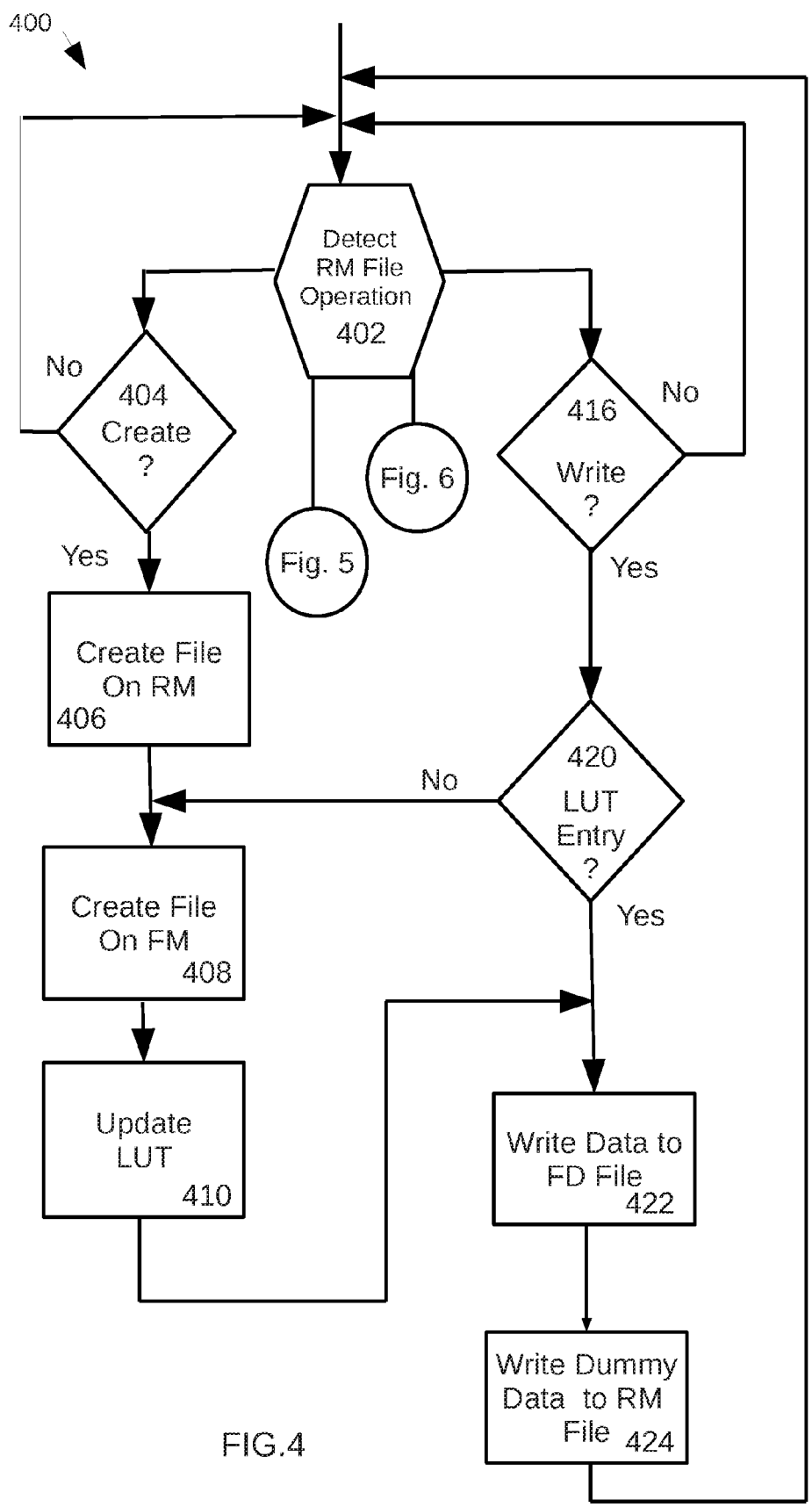
FIG. 4 is a flow chart illustrating a method for writing to removable data according to an embodiment of the invention.
Figure 5:
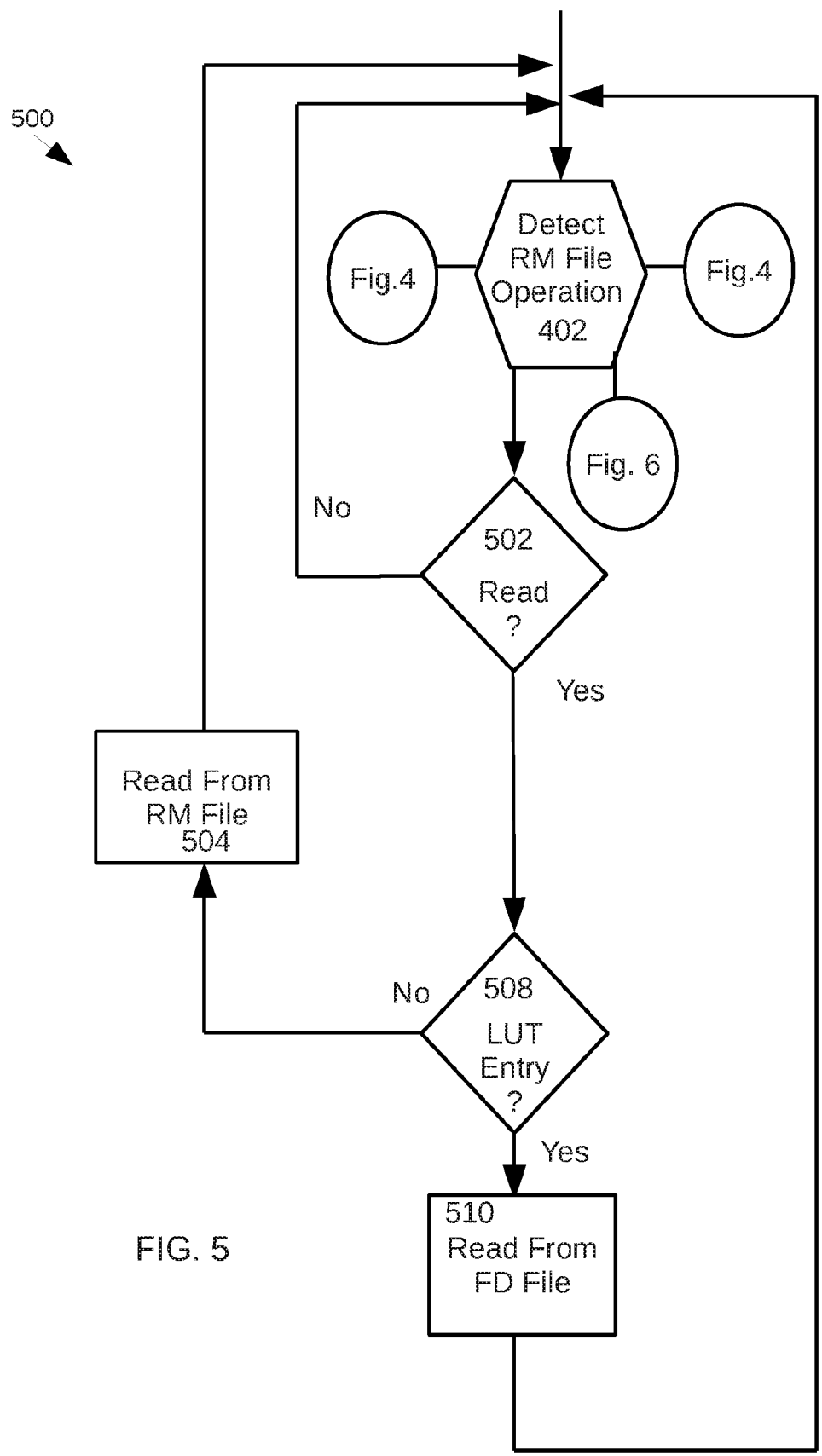
FIG. 5 is a flow chart illustrating a removable media file read operation in accordance with an embodiment of the invention.
Figure 6:
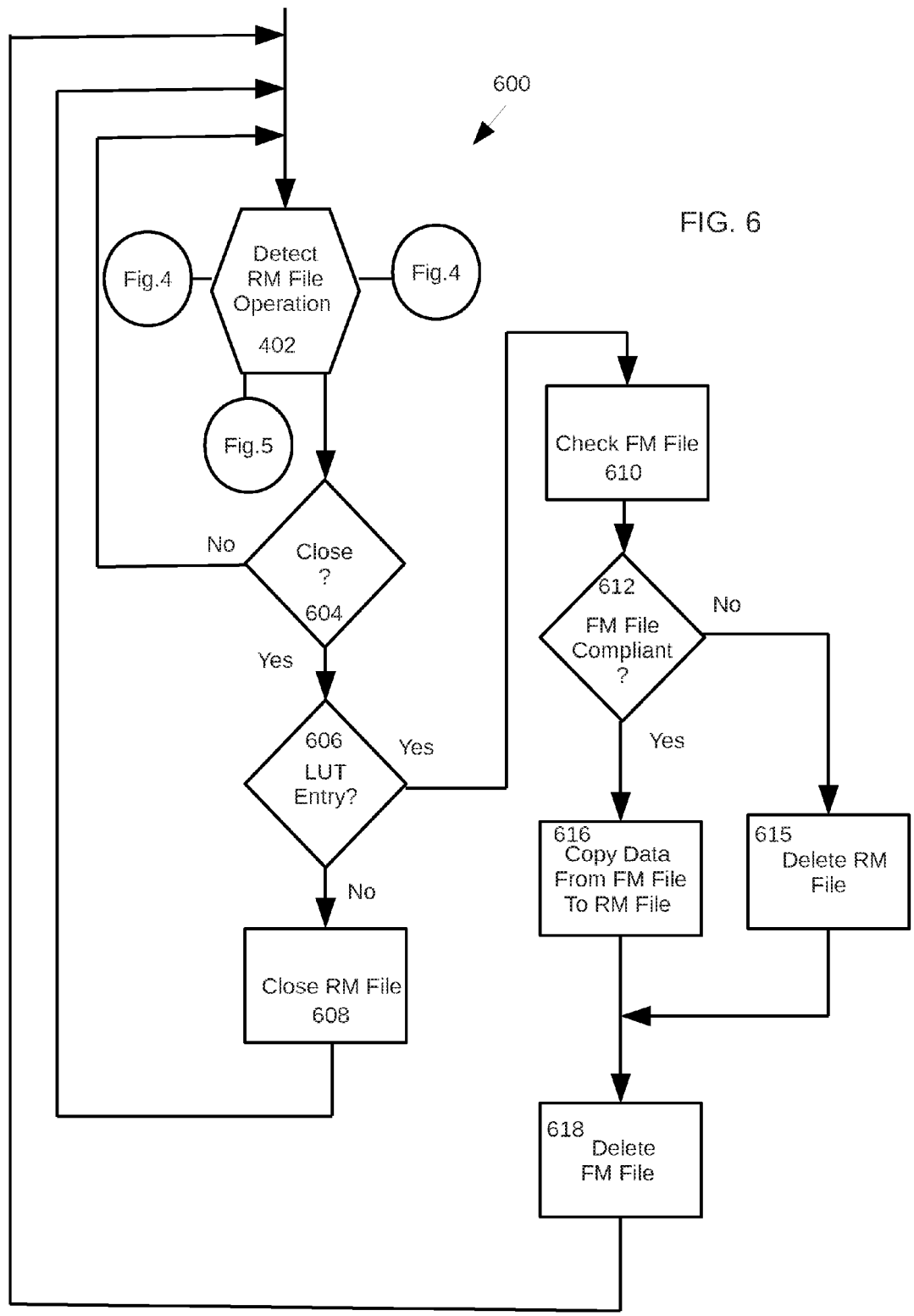
FIG. 6 is a flow chart illustrating a removable media file close operation in accordance with an embodiment of the invention.

FIG. 3 is a block diagram of a data processing system 300 equipped with a set or sequence of instructions comprising security program 313 which when executed by processor 301 in cooperation with security policy 315 and look up table 308 as described herein and in further cooperation with conventional components of system 300, performs the various methods described herein, examples of which are illustrated in FIGS. 4 through 6.

System 300 includes, but not limited to, one or more applications or programs 317 communicatively coupled to an operating system 303 in order to access data stored in a fixed media device 305 and to access data stored in a removable media device 307 via an input/output (IO) controller 309 and/or IO port 308. Suitable operating systems to comprise operating system 303 include but are not limited to, Mac OS® from Apple Inc. of Cupertino, Calif., Windows® operating system from Microsoft Corporation of Redmond, Wash., or LINUX operating system.

In some embodiments IO controller 308 may comprise a portion of a chipset implementing processor 301. IO interface port 309 comprises a communications interface such as a USB port, Firewire port, or a memory card interface. Removable media device 307 comprises any of a number of removable storage devices such as those described in conjunction with FIG. 1.

As shown in FIG. 3, the data processing system 300 includes a bus or interconnect 330 which is coupled to at least one processor 301 and system memory 302 which may comprise volatile memory such as random access memory (RAM) and/or non volatile memory such as a read only memory (ROM). The bus 330 interconnects the various components together and also interconnects a display device 311 and corresponding controller (not shown), as well as to input/output (I/O) devices (not shown) which may include mice, keyboards, modems, network interfaces, printers, and other conventional devices.

Fixed media device 305 comprises a non-volatile memory, for example a magnetic hard drive, a magnetic optical drive, an optical drive, or a DVD RAM or other type of memory system which maintains data even after power is removed from the system.

FIGS. 4 through 6 are flow charts illustrating methods for performing file operations on a removable media device comprising a data processing system, for example, removable media device 307 of system 300 illustrated in FIG. 3. The type of removable media device for which the file create or write operation is requested may comprise, for example, any of the types illustrated in FIGS. 1 and 2 or may alternatively comprise any other media device coupled to system 300 and capable of being uncoupled from system 300 without removing power from system 300. In the drawing FIGS. 4 through 6, the designation 'RM' stands for 'removable media'. The designator 'FM' stands for fixed media. The designator 'LUT' stands for 'look up table'.

FIG. 4 illustrates a method for creating a file on a removable media device and a method for writing to a file on a removable media device. At 402 the method waits to detect a request for a file operation on a removable media device. At 404 a request from a user is received, for example via an input/output device such as a mouse, keyboard or other device coupled to a data processing system by an IO controller 308 illustrated in FIG. 3. At 406 a first file is created on the removable media in accordance with the request. At 408 a second file corresponding to the first file is created on a fixed media device such as fixed media device 305 illustrated in FIG. 3. The first and second files are entered in a look up table (LUT) such as look up table 308 so as to cross reference their respective file locations on the removable and fixed storage media.

At 422 any data requested to be written to the first file in conjunction with the file create operation is instead written to the second file. At 424 'dummy data' is written to the first file. Dummy data is benign information that does not contain any useful data. Dummy data serves to reserve space on the removable media device where the first data would have been written. For example, in one embodiment of the invention dummy data comprises null values.

The method returns to 402 and waits to detect a request for a file operation on a removable media device.

At 416 a request for a write operation to a first file on a removable media device is detected. At 420 the look up table is checked to determine if a cross reference entry exists for the first file, indicating the existence of a corresponding second file on a fixed media device. If no entry exists at 408 a corresponding second file is created on the fixed media device.

At 410 the look up table is updated by entering cross referencing the corresponding second file location with the first file location on the respective corresponding removable media and fixed media devices. At 422 data that was requested to be written to the first file is instead written to the second file. At 424 dummy data is written to the first file instead of writing the requested data to the first file. The method returns to 402 and waits to detect another removable media file operation.

Returning to 420 in case a look up table entry is found to cross reference the first file on the removable media device to a corresponding second file on the fixed media device the method proceeds to 422. At 422 data that was requested to be written to the first file is instead written to the second file. At 424 dummy data is written to the first file instead of writing the requested data to the first file. The method returns to 402 and waits to detect another removable media file operation.

FIG. 5 illustrates a method for reading data from a removable media device according to an embodiment of the invention. At 402 the method waits to detect a removable media file operation. At 502 a request for to read a first file on the removable media device is detected. At 508 a look up table is checked to determine if the first file has a corresponding second file on a fixed media device. If the LUT indicates no corresponding second file exists on the fixed media device, the method may presume no file operations have been carried out with respect to the first file. In that case, the first file is read from the removable media device at 504. The method returns to 402 and waits to detect another file operation for the removable media device.

At 508 if the LUT indicates a corresponding second file exists on the fixed media device the method proceeds to 510.

At 510 the corresponding second file is read instead of reading the first file. The method returns to 402 and waits to detect another file operation for the removable media device.

FIG. 6 illustrates a method for closing a file on a removable media device according to an embodiment of the invention. At 402 the method waits to detect a removable media file operation. At 604 a request to close a first file on a removable media device is detected. At 606 the LUT is checked to determine if the first file has a corresponding second file on a fixed media device. At 608 if the LUT indicates no corresponding second file is present on the fixed media device, the first file is closed in accordance with the request. The method proceeds to 402 and waits for another file operation on the removable media device.

At 606 if the LUT indicates a corresponding second file exists on the fixed media device, the method proceeds to 610. At 610 data comprising the corresponding second file is inspected for compliance with a security policy. The term security policy refers to an automated mechanism for constraining features, functions or operations of a system that would not be constrained in normal operations in the absence of a security policy.

The invention is not limited with respect to the type of security policy implemented. In one embodiment of the invention a security policy comprises a file comprising a list of prohibited key words, word combinations, or phrases. The key words, word combinations or phrases are those considered by policy creator to be associated with sensitive data. Therefore, a file including a prohibited key word, word combination or phrase is considered non compliant with the security policy. For example a security policy list includes the phrase 'social security' and also includes the word 'confidential', among other words. An inspection of the contents of a file that uncovered either the prohibited phrase 'social security' or the prohibited word 'confidential, or any other word on the security policy list is not compliant with the security policy. A file free from any of the prohibited words, word combinations or phrases on the security policy list is compliant with the security policy.

Alternative embodiments of the invention may implement security policies other than a key word list. For example, alternative embodiments may employ a text analyzer capable of determining compliance based on meaning inferred from text patterns or other file attributes, or a combination of attributes or factors. In one embodiment of the invention, a machine readable medium containing instructions comprising an application program, for example, will also comprise a security policy for the application program that may be used in the methods described herein.

At 612 if the corresponding second file does not comply with the security policy, the first file, i.e., the file on the removable media is deleted at 615. At 618 the corresponding second file is deleted. The method returns to 402 and waits to detect another request for a file operation on a removable media device.

At 612 if the corresponding second file on the fixed media is compliant with the security policy, data comprising the corresponding second file is copied to the first file at 616. At 618 the corresponding second file is deleted from the fixed media device. The method then returns to 402 and waits to detect another file operation for the removable media device.

The foregoing description of specific embodiments reveals the general nature of the inventive subject matter sufficiently that others can, by applying current knowledge, readily modify and/or adapt it for various applications without departing from the generic concept. Such adaptations and modifications are intended to remain within the meaning and range of equivalents of the disclosed embodiments. They employed herein is for the purpose of description and not of limitation. Accordingly, the inventive subject matter embraces all such alternatives, modifications, equivalents and variations as fall within the spirit and broad scope of the appended claims.

Method embodiments described herein may be computer-implemented. Some embodiments may include computer-readable media encoded with a computer program (e.g., software), which includes instructions operable to cause an electronic device such as a computer to perform methods of various embodiments. A software implementation (or computer-implemented method) may include microcode, assembly language code, or a higher-level language code, which further may include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM), read only memories (ROM), and the like.

In the foregoing description of various embodiments, reference is made to the accompanying drawings, which form a part hereof and show, by way of illustration, specific embodiments for practicing the subject matter. Various embodiments are described in sufficient detail to enable those skilled in the art to practice the inventive subject matter. It will be understood other embodiments may be utilized, and process or mechanical changes may be made, without departing from the scope of the inventive subject matter.

It will be recognized that the methods of various embodiments can be combined in practice, either concurrently or in succession. Various permutations and combinations of various embodiments of the invention remain within the scope of the inventive subject matter may be readily apparent to those skilled in the art.

What is claimed is:

1. A method for writing data to a removable media device in accordance with a security policy comprising:
   detecting a request to write data to a first file on the removable media device;
   writing dummy data to the first file instead of writing the data;
   writing the data to a corresponding second file on a fixed media device;
   comparing the second file data to a security policy; and
   based on the comparison, either copying the corresponding second file data to the first file if the second file is free of sensitive data, or deleting the corresponding second file without copying the corresponding second file data to the first file if the corresponding second file includes sensitive data.

2. The method of claim 1 further comprising:
   detecting a request from the input device to close the first file; and
   closing the first file after copying the corresponding second file data to the first file.

3. The method of claim 1 wherein deleting the corresponding second file is carried out in response to a request from the input device to close the first file.

4. The method of claim 1 further comprising:
   detecting a request to read data from the first file; and
   reading the data to the corresponding second file in response to the request.

5. A system for writing data to a removable media device comprising:
- a computer including an input means, a display means, a fixed media and a removable media device;
- an operating system controlling the computer to carry out file operations on the fixed media device and on the removable media device in response to respective corresponding file operation commands;
- a security policy;
- a removable media security program capable of communicating with the operating system to detect a command to write the data to a first file on a removable media, the security program communicating with the operating system to cause the computer to instead write the data to a corresponding second file on the fixed media for; and
- the removable media security program either copying the data from the corresponding second file to the first file in case the second file complies with a security policy, or deleting the second file without copying the second file data to the first file in case the second file violates the security policy.

6. The system of claim 5, wherein the removable media security program is further capable of communicating with the operating system to cause the computer to close the first file after copying the corresponding second file data to the first file in response to a request to close the first file.

* * * * *